United States Patent
Kwon et al.

(10) Patent No.: US 8,199,848 B2
(45) Date of Patent: Jun. 12, 2012

(54) PRECODING DEVICE AND METHOD IN WIRELESS COMMUNICATION SYSTEM

(75) Inventors: Dong-Seung Kwon, Daejeon (KR); In-Kyeong Choi, Daejeon (KR); Hyong-Woo Ku, Seoul (KR); Ji-Won Kang, Incheon (KR); Chung-Yong Lee, Seoul (KR)

(73) Assignees: Electoronics and Telecommunications Research Institute, Daejeon (KR); Samsung Electornics Co., Ltd., Suwon-si (KR)

( * ) Notice: Subject to any disclaimer, the term of this patent is extended or adjusted under 35 U.S.C. 154(b) by 643 days.

(21) Appl. No.: 12/443,337

(22) PCT Filed: May 15, 2007

(86) PCT No.: PCT/KR2007/002383
§ 371 (c)(1),
(2), (4) Date: Mar. 27, 2009

(87) PCT Pub. No.: WO2008/038878
PCT Pub. Date: Apr. 3, 2008

(65) Prior Publication Data
US 2010/0074364 A1   Mar. 25, 2010

(30) Foreign Application Priority Data
Sep. 29, 2006 (KR) .................. 10-2006-0095519
Nov. 30, 2006 (KR) .................. 10-2006-0119829

(51) Int. Cl.
*H04L 25/03* (2006.01)
(52) U.S. Cl. .................. 375/284; 375/285; 375/296
(58) Field of Classification Search .................. 375/260, 375/267, 284, 285, 295, 296
See application file for complete search history.

(56) References Cited

U.S. PATENT DOCUMENTS

| 6,192,042 | B1 | 2/2001 | Seo |
| 6,587,512 | B1 | 7/2003 | Reuven et al. |
| 2007/0082623 | A1* | 4/2007 | Mattheijssen et al. ........ 455/101 |
| 2007/0201536 | A1* | 8/2007 | Nicolas et al. ................ 375/141 |
| 2007/0217386 | A1 | 9/2007 | Visoz et al. |

(Continued)

FOREIGN PATENT DOCUMENTS

KR   10-1999-0052334 A   7/1999

(Continued)

OTHER PUBLICATIONS

Christoph Windpassinger et al., Precoding in Multiantenna and Multiuser Communications, Manuscript IEEE Transactions on Wireless Communications, Jul. 2004, pp. 1305-1316, vol. 3, No. 4.
Athanasios P. Liavas, Tomlinson-Harashima Precoding with Partial Channel Knowledge, Manuscript IEEE Transactions on Communications, Jan. 2005, pp. 5-9, vol. 53, No. 1.

(Continued)

*Primary Examiner* — David B. Lugo
(74) *Attorney, Agent, or Firm* — Jefferson IP Law, LLP (57) ABSTRACT

The present invention relates to a precoder and a precoding method in a multi-user multi-antenna communication System. When a transmission part (100) having a plurality of antennas transmits a plurality of signals to a receiving part (200) having an antenna, the precoder and the precoding method using the same prevents System performance degradation caused by interference signals and efficiently reduces transmission power while changing the constellation rotary angle. When the power is controlled by using the precoder, the System performance is enhanced while not damaging the structural gain of the existing multi-user multi-antenna precoder.

12 Claims, 8 Drawing Sheets

U.S. PATENT DOCUMENTS

2007/0291868 A1 * 12/2007 Olesen et al. .................. 375/267

FOREIGN PATENT DOCUMENTS

| KR | 10-2002-0081221 A | 10/2002 |
|---|---|---|
| KR | 10-2006-0064501 A | 6/2006 |
| KR | 10-2007-0017385 A | 2/2007 |
| WO | 01/43382 A1 | 6/2001 |
| WO | 2005/011219 A1 | 2/2005 |
| WO | 2006-062356 A1 | 6/2006 |

OTHER PUBLICATIONS

Ivan Cosovic et al., A Non-Linear Precoding Technique for Downlink MC-CDMA, IEEE 61st Vehicular Technology Conference, May 30-Jun. 1, 2005, pp. 1711-1715, vol. 3.

Yu Fu et al., Non-Linear Limited-Feedback Precoding for ICI Reduction in Closed-Loop Multiple-Antenna OFDM Systems, IEEE Global Telecommunications Conference, Nov. 2-Dec. 2005, pp. 3087-3091, vol. 5.

* cited by examiner

PRECODING DEVICE AND METHOD IN WIRELESS COMMUNICATION SYSTEM

TECHNICAL FIELD

The present invention relates to a wireless communication system, and in particular, it relates to a precoding device and method in a multi-user multi-antenna communication system.

BACKGROUND ART

In general, differing from a wired channel environment, a radio channel environment in a communication system receives distorted signals through the real transmission signals because of many factors such as multipath interference, shadowing, attenuation, and time-varying noise and interference. In this instance, fading caused by the multipath interference relates to a reflector or a user, that is, a mobile terminal of a mobile station, and the mobile terminal receives signals that are a mix of the real transmission signals and interference signals.

Therefore, the received signals are substantially distorted real transmission signals and they degrade performance of the entire wireless communication system. Resultantly, the fading phenomenon can distort the amplitude and the phase of the received signals, and is a main factor generating a problem in high-speed data communication in the radio channel environment. Many studies have been progressed so as to solve the fading phenomenon, one of which is the multiple-input multiple-output (MIMO) system.

The MIMO system uses multiple antennas in the transmitting/receiving part to generate a plurality of independent fading channels and transmits different signals for the respective transmit antennas, thereby substantially improving the data rates. However, the MIMO system is weak in inter-symbol interference of transmission signals generated by high data rates and frequency selective fading. In addition, a precoder is used to perform a predetermined precoding process on the transmission signals so as to eliminate the influence of signal interference among multiple users, but the power difference between the signal interference and the transmission signal is increased to deteriorate the signal-to-noise ratio (SNR), generating performance degradation.

The above information disclosed in this Background section is only for enhancement of understanding of the background of the invention and therefore it may contain information that does not form the prior art that is already known in this country to a person of ordinary skill in the art.

DISCLOSURE OF INVENTION

Technical Problem

The present invention has been made in an effort to provide a precoder in a low-power multi-user (MU) MIMO system having advantages of controlling power to improve system performance. The present invention has been made in another effort to provide a method for efficiently controlling power by using a precoder.

Technical Solution

According to one aspect of the present invention, a precoder for precoding a transmission signal when a transmission part transmits the transmission signal to a receiving part in a wireless communication system is provided. The precoder includes an interference signal real channel generator, a rotary angle selector, a modulo operator, and a matrix multiplier. The interference signal real channel generator extracts an interference signal to be acted on a first user's transmission signal by using the first user's transmission signal and a transmitted signal of at least one second user who has transmitted a signal prior to the first user. The rotary angle selector selects a rotary angle for rotating a constellation of the first user's transmission signal by using information on the number of rotary angle types, and the number of the rotary angle types is extracted based on channel information for a plurality of users including the first user and the interference signal. The modulo operator eliminates the interference signal from the first user's transmission signal. The matrix multiplier uses the first user's transmission signal from which the interference signal is eliminated to transmit the first user's transmission signal to the receiving part by rotating a constellation by the selected rotary angle.

According to another aspect of the present invention, a precoder for receiving and precoding a signal transmitted from a transmission part to a receiving part in a wireless communication system is provided. The precoder includes a rotary angle estimator and a modulo operator/demodulator. The rotary angle estimator estimates constellation rotary angles of received signals from a plurality of users based on information on the number of rotary angle types extracted based on user channel information. The modulo operator/demodulator rotates the received signal by the estimated constellation rotary angle so that the received signal may maintain the constellation. In addition, the modulo operator/demodulator performs a modulo operation on the received signal to determine the received signal's location, and restores data bit of the signal received through demodulation.

According to yet another aspect of the present invention, a method for precoding a transmission signal when a transmission part transmits the transmission signal to a receiving part through a communication channel in a wireless communication system is provided. The method includes: selecting a constellation rotary angle of a transmission signal for a first user to be transmitted; performing a modulo operation on the transmission signal to control transmission power; eliminating an interference signal from the transmission signal whose transmission power is controlled; multiplying the transmission signal from which the interference signal is eliminated by a matrix to set a communication channel; and rotating and transmitting the transmission signal through the extracted communication channel by using the selected constellation rotary angle.

According to further another aspect of the present invention, a precoding method for receiving and precoding a signal transmitted from a transmission part to a receiving part in a wireless communication system is provided. The precoding method includes: gathering a plurality of received signals from a plurality of users for a predetermined interval; averaging each received signal during the predetermined interval to estimate a constellation rotary angle of each received signal; rotating each received signal by the corresponding constellation rotary angle to maintain the original constellation; performing a modulo operation on the average value of each received signal to determine the position of each received signal; and demodulating each received signal whose position has been determined to restore a data bit.

BEST MODE FOR CARRYING OUT THE INVENTION

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In addition, unless explicitly described to the contrary, the word "comprise" and variations such as "comprises" and "comprising" will be understood to imply the inclusion of stated elements but not the exclusion of any other elements.

It will be assumed before describing an exemplary embodiment of the present invention that a communication service is provided to a plurality of users when a transmission part has a plurality of antennas and the users have a single antenna. In this case, substantial performance degradation is generated since the respective users cannot eliminate the interference signal provided to them. In order to eliminate the interference signal between the users, a multi-user multi-antenna precoder using channel information is used, which will now be described with reference to FIG. 1.

Figure 1:
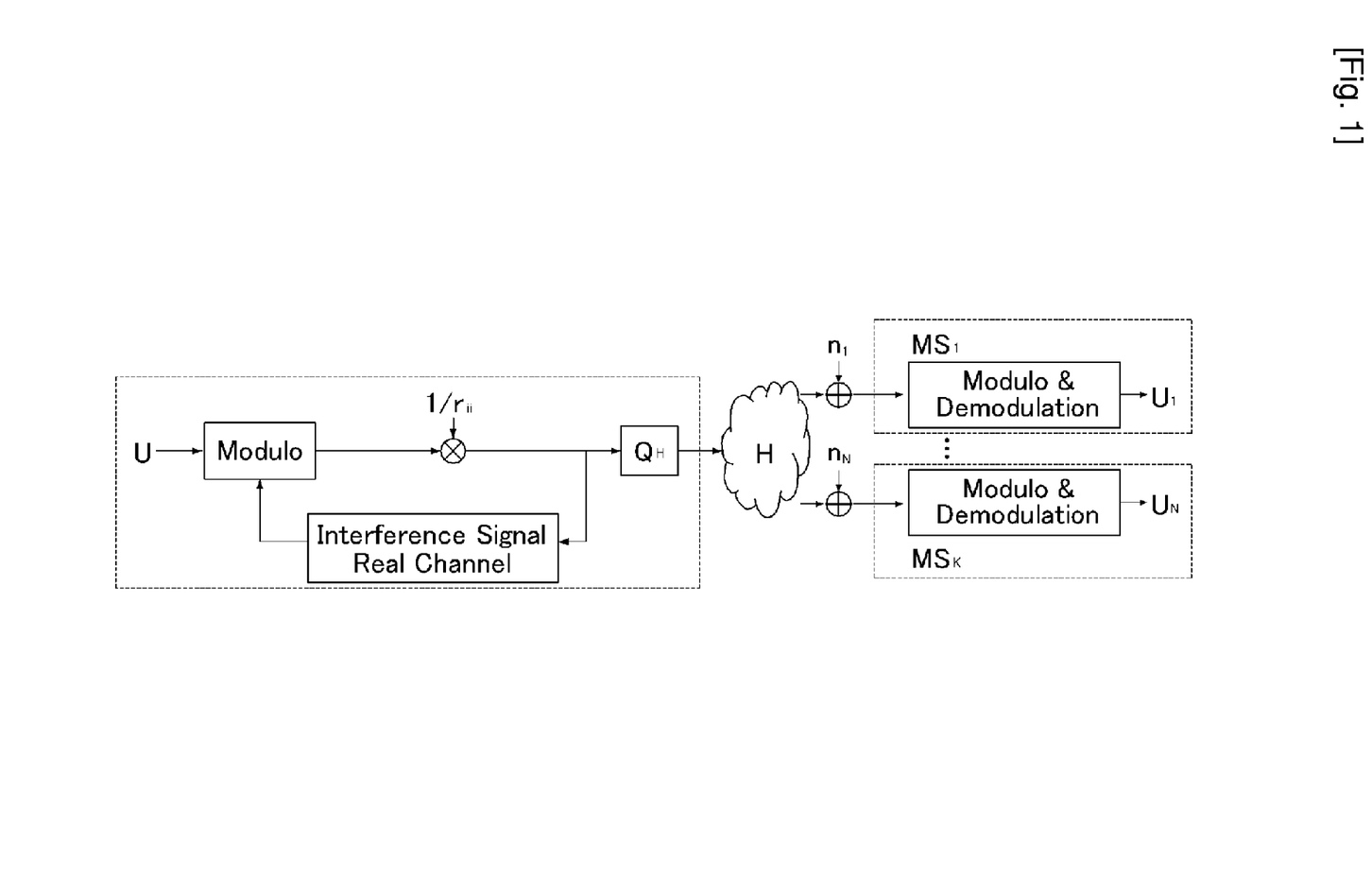
FIG. 1 is a configuration diagram for a conventional multi-user multi-antenna precoder.

FIG. 1 is a configuration diagram for a conventional multi-user multi-antenna precoder.

As shown in FIG. 1, the precoder in the full feedback-based multi-user MIMO system includes channels fed back by the users to configure an entire channel matrix. The precoder uses QR decomposition to decompose the configured channel matrix into a unitary matrix (Q) and a triangular matrix (R), and uses the same to precode transmission signals to be transmitted to the multiple antennas. The above-noted process is performed in order for the transmission part to eliminate the multi-user interference (MUI) and then transmit the signals since the signals among all users are mixed and received in the general channel matrix status.

Therefore, the triangular matrix can function as an effective channel by using the decomposed channel since the Hermitian value of the unitary matrix is multiplied with the transmission signal and a resultant signal is transmitted to the receiving part, which will be given in equations First, the vector y that is signals to be received by the respective users is expressed in Equation 1.

$$\vec{y} = H\vec{x} + \vec{n} \qquad \text{(Equation 1)}$$

Wherein, a vector x is a plurality of transmission signal vectors transmitted to a plurality of users, a vector n is a noise vector undergone by the users, and H is a channel matrix.

When the signal of Equation 1 is transmitted to the users, normal communication cannot be performed since other users' signals are mixed through the channel. In this instance, Equation 2 is found by decomposing the configured channel matrix into a unitary matrix and a triangular matrix by using QR decomposition.

$$\vec{y} = RQ\vec{x} + \vec{n} \qquad \text{(Equation 2)}$$

Wherein, R is a triangular matrix and Q is a unitary matrix.

Equation 3 is acquired when the transmission part has channel information and multiplies the channel information by $Q^H$, and then transmits a resultant signal to the receiving part.

$$\vec{y} = RQQ^H\vec{x} + \vec{n} \qquad \text{(Equation 3)}$$
$$= R\vec{x} + \vec{n}$$

Wherein, the subscript H is a mathematical operation Hermitian changing the matrix.

Referring to Equation 3, the effective channel is changed from H of Equation 1 to R, which will be given in further detail in Equation 4.

$$\begin{pmatrix} y_1 \\ y_2 \\ \vdots \\ y_K \end{pmatrix} = \begin{pmatrix} r_{1,1} & 0 & \cdots & 0 \\ r_{2,1} & r_{2,2} & 0 & \cdots \\ \vdots & & \ddots & \\ r_{K,1} & r_{k,2} & \cdots & r_{K,K} \end{pmatrix} \begin{pmatrix} x_1 \\ x_2 \\ \vdots \\ x_K \end{pmatrix} + \begin{pmatrix} n_1 \\ n_2 \\ \vdots \\ n_K \end{pmatrix} \qquad \text{(Equation 4)}$$

That is, as expressed in Equation 4, the first user ($y_1$) receives no interference signal from the other users ($y_2$-$y_k$). Regarding the second user ($y_2$), the signal of the first user ($y_1$) before the second user ($y_2$) functions as an interference signal, and the second user ($y_2$) receives the interference signal and the signal of the second user ($y_2$). In detail, the signal of a certain user functions as an interference signal to the next user.

Therefore, the transmission part sequentially eliminates in advance the interference signal that will be applied to the users and then transmits resultant signals to the receiving part, which will be given as Equation 5.

$$y_k = r_{k,k}\left\{\left(x_k - \sum_{l=1}^{k-1} r_{k,l}x_l\right)\bigg/ r_{kk}\right\} + \sum_{l=1}^{k-1} r_{k,l}x_l + n_k \qquad \text{(Equation 5)}$$
$$= x_k + n_k$$

Accordingly, the transmission part eliminates the interference signal in advance and transmits the resultant signal to the users to thus eliminate the influence of the interference signal. However, when the difference between the signal to be transmitted and the interference signal is large, transmission power is substantially increased. That is, the transmission signal becomes too large and the signal-to-noise ratio (SNR) is disadvantaged.

In order to solve the problem, practical dirty-paper coding (DPC) algorithms are used to control power of the transmission signal. The Tomlinson Harashima precoder (THP) is mainly used to control the transmission power from among a plurality of DPC algorithms. The THP performs a modulo operation and then transmits signals to the receiving part from the transmission part in order to prevent the transmission power from being substantially increased. That is, power of the transmission signal is controlled to be forcibly maintained within a predetermined range by the modulo operation.

However, the THP generates modulo loss because of the modulo operation. In this instance, the modulo loss represents performance degradation that is generated when the noise applied signal is transmitted in a totally different direction because of the modulo operation. That is, when the modulo operation is not performed, the transmission is transmitted to be located near the original signal even though the transmission signal is influenced by noise through a channel, and when the modulo operation is performed, the transmission signal can be transmitted in the opposite direction because of the modulo operation.

Accordingly, the conventional multi-user multi-antenna precoder efficiently reduces transmission power but has limited system performance since it only uses the modulo operation. Therefore, the exemplary embodiment of the present invention provides a precoder for improving system performance while changing the rotary angle of the constellation. The precoder according to an exemplary embodiment of the present invention will now be described with reference to FIG. 2.

Figure 2:
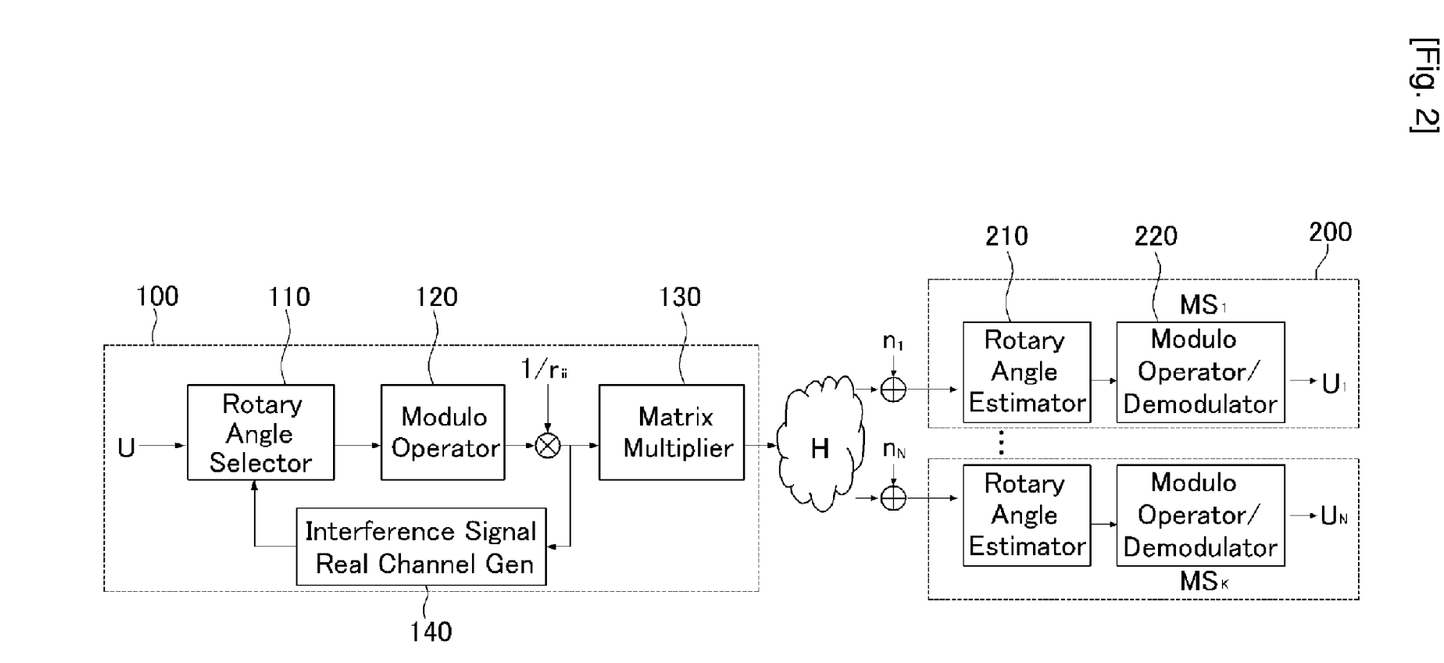
FIG. 2 is a configuration diagram for a multi-user multi-antenna precoder according to an exemplary embodiment of the present invention.

FIG. 2 is a configuration diagram for a multi-user multi-antenna precoder according to an exemplary embodiment of the present invention.

As shown in FIG. 2, the precoder includes a transmission part 100 and a receiving part 200 connected to each other through a communication channel. The transmission part 100 includes a rotary angle selector 110, a modulo operator 120, an interference signal real channel generator 140, and a matrix multiplier 130, and the receiving part 200 includes a rotary angle estimator 210 and a modulo operator/demodulator 220.

The rotary angle selector 110 included in the transmission part 100 selects a rotary angle for changing the constellation of the signal to be transmitted. That is, during a predetermined interval that is a block unit for transmitting the signal, the rotary angle selector 110 selects the rotary angle having the minimum average power that is generated by eliminating the interference signal from the transmission signal.

In this instance, the rotary angle for minimizing the average power represents a rotary angle having the minimum difference between the interference signal and the transmission signal. The difference between the interference signal and the transmission signal will be described referring to FIG. 4.

The modulo operator 120 performs a modulo operation on the signal that is generated by eliminating the transmission signal from the interference signal and the rotary angle selected by the rotary angle selector 110. Power amplification is prevented through the modulo operation. In this instance, the modulo operation expands the transmission symbols in a two-dimensional area, selects the signal in the area that is nearest to the interference signal, eliminates the interference signal, and transmits a resultant signal to thus prevent the power of the transmission signal from being increased.

The interference signal real channel generator 140 detects and extracts the real channel of the interference signal that acts on the transmission signal. In this instance, the interference signal real channel generator 140 uses a unitary matrix and a triangular matrix by using the QR decomposition on the entire channel matrix formed by collecting user channel information received from a plurality of users. Since the original interference signal can be influenced by a plurality of signals until it is transmitted to the transmission part 100, it is needed to extract the real channel of the interference signal corresponding to the signal.

In this instance, the rotary angle for the transmission signal of the previous user is selected and then the real channel of the interference signal of the next user is extracted since the signal of the previous user acts as an interference signal of the transmission signal of the next user when the rotary angle is selected and the transmission signal of the previous user is transmitted with the rotary angle.

In this instance, the real channel of the interference signal is generated by using the triangular matrix that is generated by applying QR decomposition to the entire channel matrix. Here, the formation of the entire channel matrix is well known for the full feedback-based precoder, and therefore will not be described in the exemplary embodiment of the present invention.

The matrix multiplier 150 multiplies the interference signal eliminated transmission signal by a unitary matrix so that the triangular matrix generated by QR decomposition may be a valid channel that is a real communication channel.

The rotary angle estimator 210 of the receiving part 200 of the precoder for receiving the signal from the transmission part 100 stores the signals received from the users for a predetermined time and averages the stored signals to estimate the rotary angle of the constellation. In this instance, the signals received from the users are influenced by white Gaussian noise while passing through the communication channel.

When the rotary angle of the signal received from the rotary angle estimator 210 is estimated, the modulo operator/demodulator 220 returns the angle by the rotated angle to maintain the original constellation, and restores the original signal through the modulo operation and the demodulation process. The modulo operator/demodulator 220 performs the modulo operation and the demodulation process.

In this instance, the modulo operation represents an operation for performing a modulo operation when receiving a signal, and returning a symbol to the original position when the symbol received by the receiving part 200 is not the original symbol but a symbol located at another position. The demodulation process corresponds to the demodulation process in the conventional communication system, and it restores the symbols that are generated by modulating the bits by the transmission part 100 into the original bits. The modulo operation and the demodulation process are well known to a person skilled in the art and so no detailed description will be provided in the exemplary embodiment of the present invention.

Figure 3:
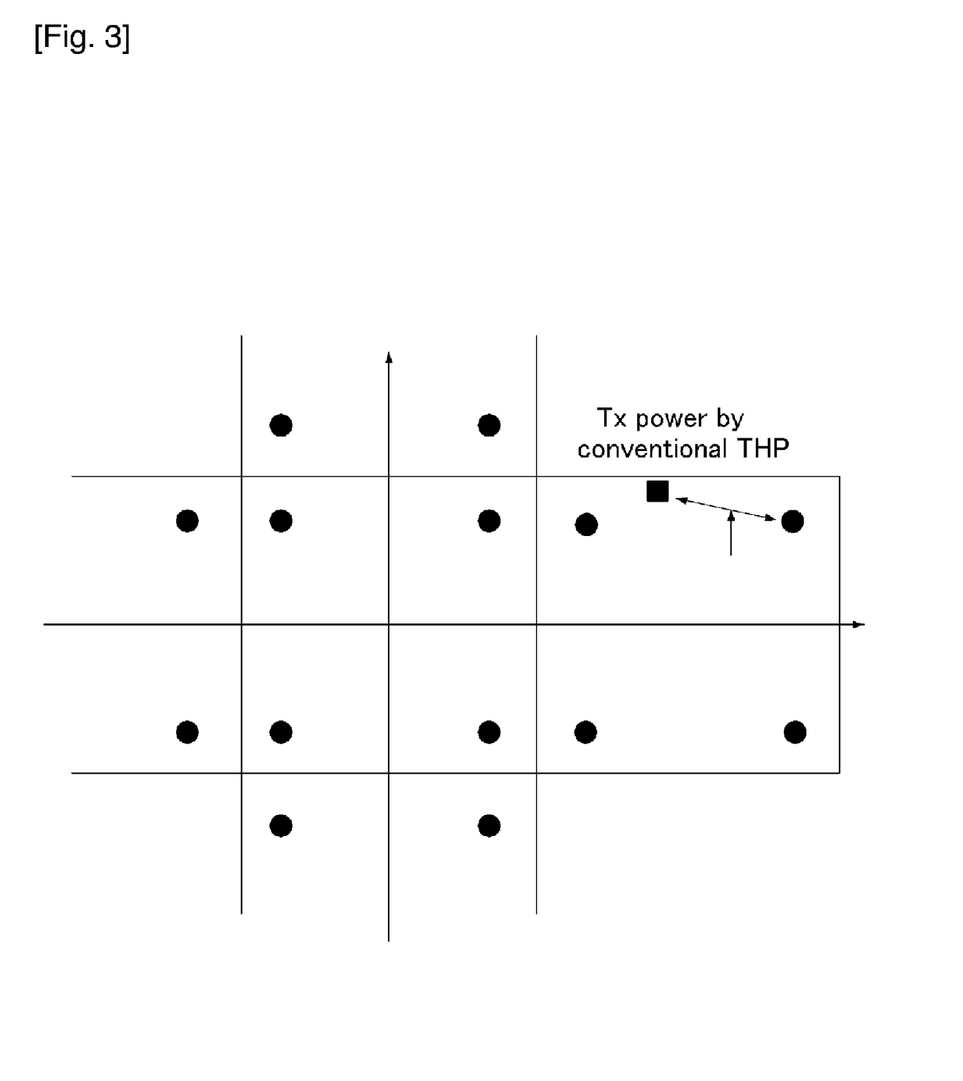
FIG. 3 shows transmission power according to a conventional Tomlinson Harashima precoder (THP.)
Figure 4:
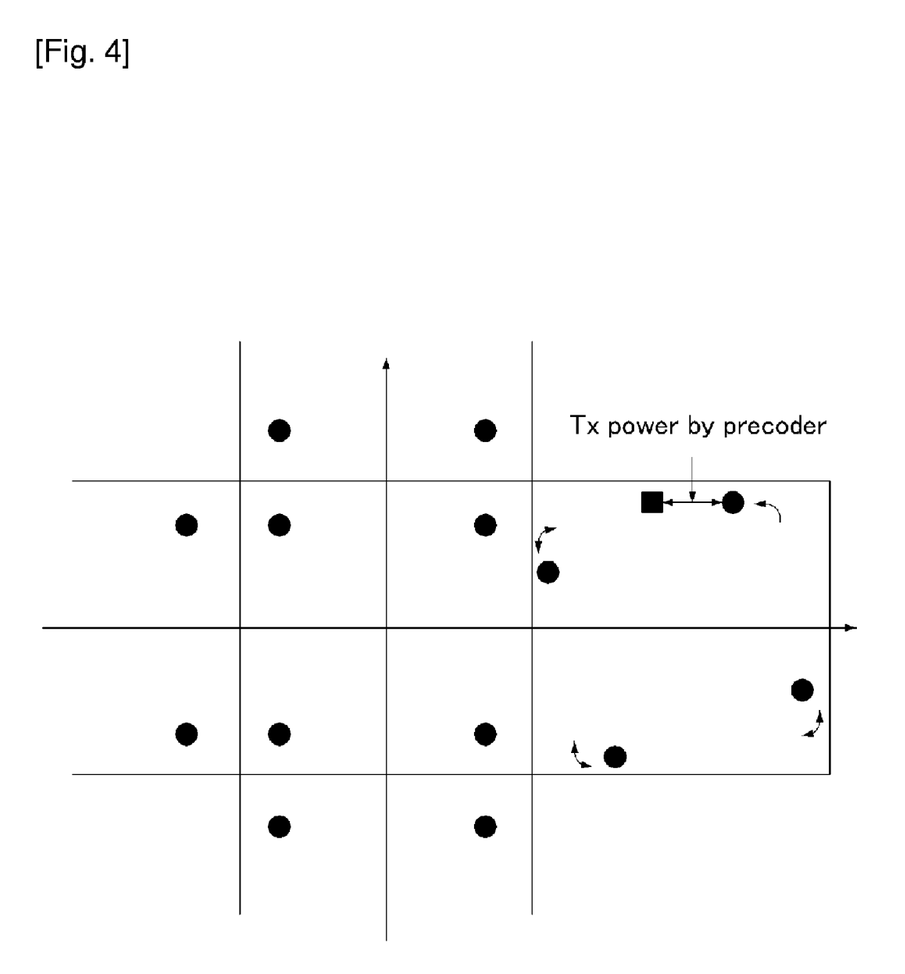
FIG. 4 shows transmission power according to an exemplary embodiment of the present invention.

A method for controlling the transmission power by using the precoder will now be described, and the transmission power will be described as shown in FIG. 4 by comparing it with the conventional transmission power shown in FIG. 3.

FIG. 3 shows the transmission power according to a conventional THP, and FIG. 4 shows the transmission power according to an exemplary embodiment of the present invention.

Regarding the transmission power according to the conventional THP precoder, as shown in FIG. 3, the conventional THP precoder expands the constellation in many directions through the modulo operation to save transmission power. Compared to this, the transmission power according to the exemplary embodiment of the present invention is shown in FIG. 4.

The THP for eliminating the interference signal is improved in the exemplary embodiment of the present invention, and no information data rate is considered when comparing it to the existing THP scheme since no additional information for reducing the transmission power is needed. According to the exemplary embodiment of the present invention, constellation rotation of the transmission signal that is an additional selection effect is used so as to improve the THP performance.

That is, as shown in FIG. 4, the rotary angle for minimizing the average power that is generated by eliminating the interference signal during a predetermined interval while rotating the constellation, that is, the real transmission power, is found (which is indicated by the length of the arrow in FIG. 4). The transmission part 100 transmits the transmission signal to the receiving part 200 during a predetermined interval through the rotated constellation. In this instance, since the rotated rotary angle is estimated by the receiving part 200, the transmission part and the receiving part 100 and 200 mutually know the rotated rotary angle, select the number of rotary angle types, and use one rotary angle among the selected rotary angle types.

For example, the axis X represents the real part and the axis Y represents the imaginary part in the graph of FIG. 4. The rotary angle selector 110 uses the value that is generated by squaring the real part and the imaginary part of the transmission signal to be transmitted and the value that is generated by subtracting the real part and the imaginary part of the interference signal and squaring the subtracted value, and the rotary angle having the minimum value calculated in this instance is found.

When the transmission part 100 rotates the constellation and transmits the signal so as to minimize the transmission power, the receiving part 200 receives a plurality of symbols during the predetermined interval, estimates the rotated rotary angle of the transmission signal based on the information on the number of rotary angle types, and thereby finds the data bit that is the original signal. The method for estimating the rotary angle will now be described with reference to FIG. 5.

Figure 5:
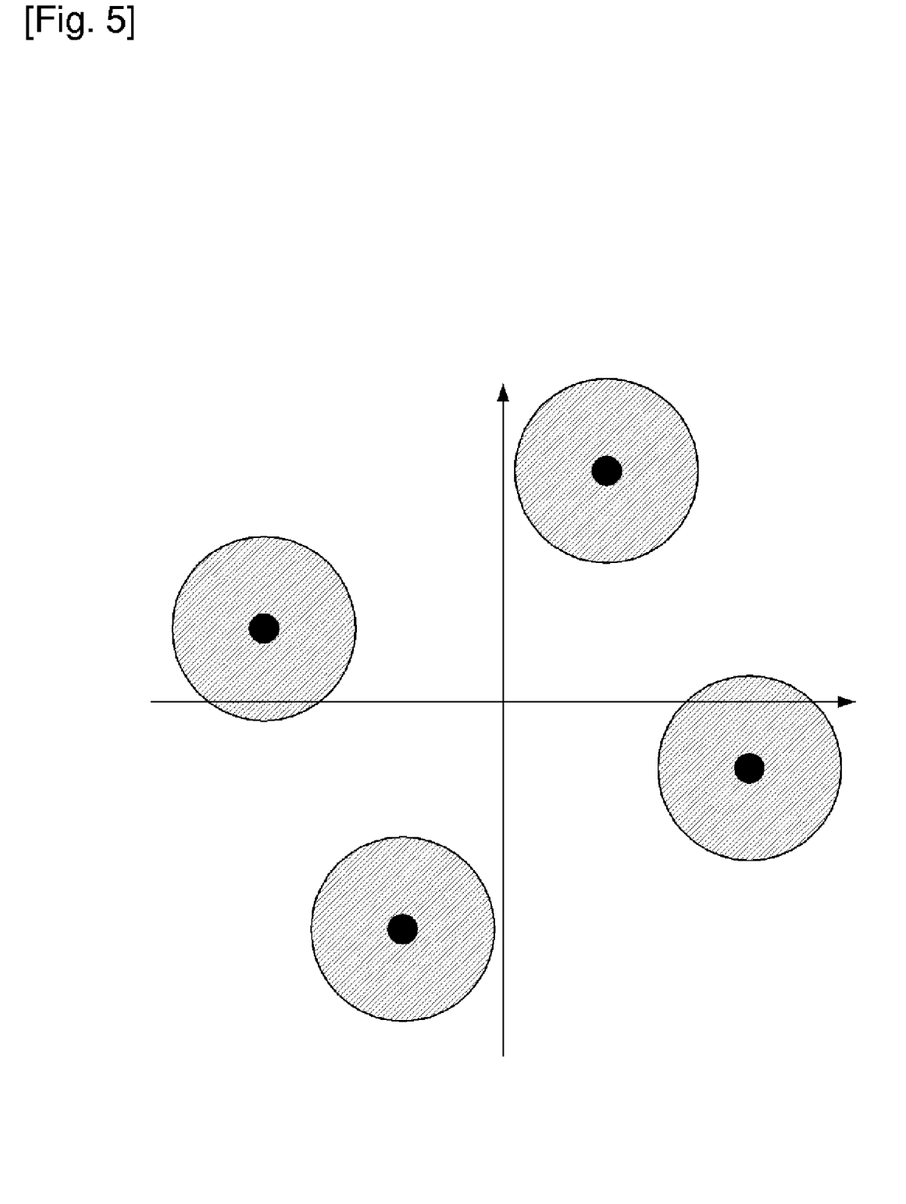
FIG. 5 shows rotary angle estimation of a precoder according to an exemplary embodiment of the present invention.

FIG. 5 shows rotary angle estimation of a precoder according to an exemplary embodiment of the present invention.

As shown in FIG. 5, when the receiving part 200 receives the symbols within a predetermined circular range, the constellation is estimated by taking the average of the received symbols. That is, when the channel symbols having the rotated constellation for a plurality of users are transmitted from the transmission part 100 to the receiving part 200, the receiving part 200 knows that the symbols are distributed within a predetermined range shown in FIG. 5. In this instance, the rotary angle estimator 210 of the receiving part 200 finds the average of the distributed symbols to estimate the rotary angle of the rotated constellation as a dot.

The length of the predetermined interval must be very large in order for the receiving part 200 to estimate the rotary angle that is rotated through averaging. This is because the rotary angle cannot be accurately estimated due to noise when the length of the predetermined interval is small, and hence, the signal of the predetermined interval is not accurately detected.

According to the exemplary embodiment of the present invention, since the transmission part 100 does not transmit additional information on the rotary angle, the receiving part 200 may not accurately estimate the angle, and substantial performance degradation is generated. That is, when the real channel state is not good or when the signal-to-noise ratio (SNR) is not good and so further noise influence is generated, the performance may be degraded compared to that of the existing THP.

Accordingly, an instantaneous selection on the number of rotary angle types will be described in the exemplary embodiment of the present invention with reference to FIG. 6.

Figure 6:
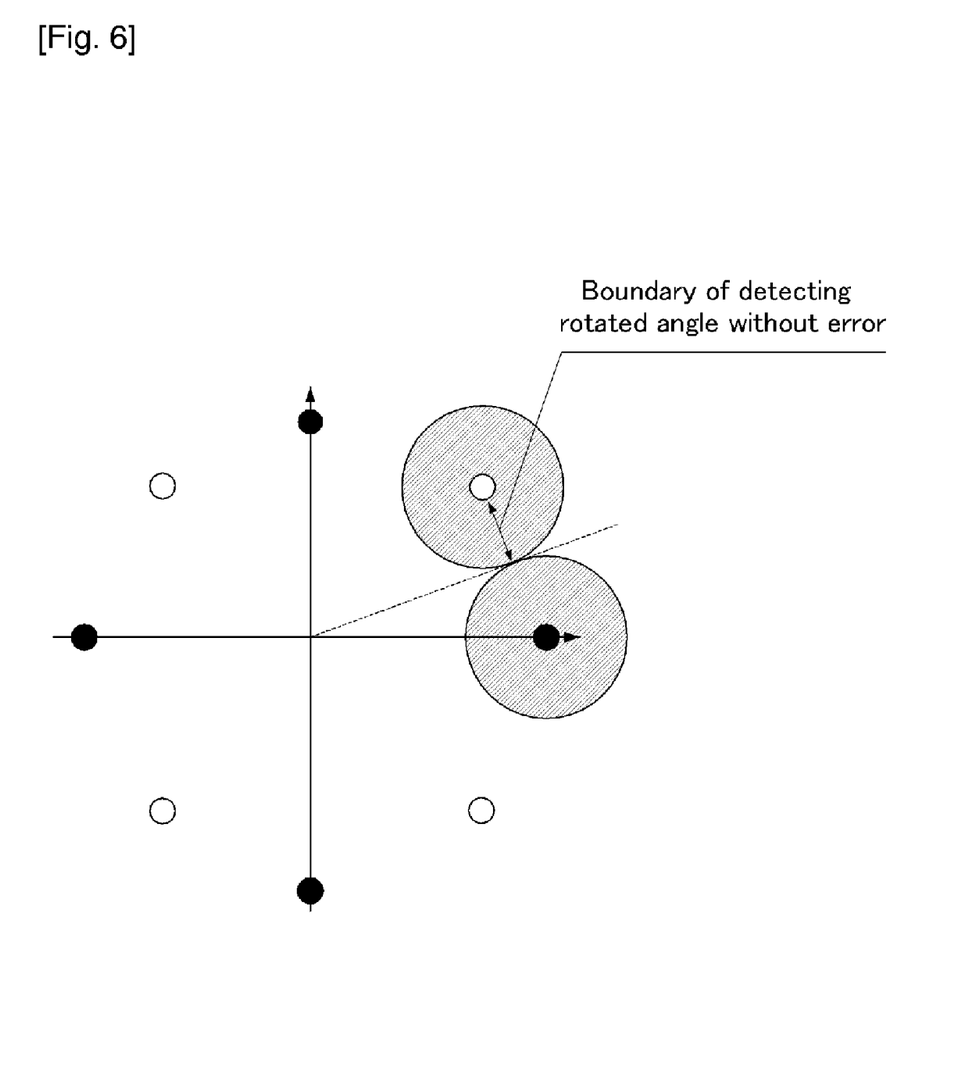
FIG. 6 shows a switching boundary according to an exemplary embodiment of the present invention.

FIG. 6 shows a switching boundary according to an exemplary embodiment of the present invention.

It is proposed in FIG. 6 to select one of the original constellations and the constellation rotated by 45 degrees. That is, the number of rotary angle types is selected so that the distribution of noise calculated by the signal-to-noise ratio (SNR) and the real channel state may be provided within the boundary for estimating the rotary angle without errors.

The selected number of rotary angle types is variable depending on the channel state, and the transmission part 100 and the receiving part 200 of the precoder have corresponding information. That is, during the idle period in which no signal is transmitted or received, the precoder acquires the channel status, selects the number of rotary angle types, and starts to transmit/receive the signal while the transmission part and the receiving part 100 and 200 know them. FIG. 6 shows the case in which two rotary angle types (the original constellation and the constellation rotated by 45 degrees) are selected.

In this instance, the rotary angle for preventing the signals from being overlapped when the constellation indicated as a square block is rotated is 45 degrees as shown in FIG. 4. That is, the angle of 45 degrees allows rotation without interference within 90 degrees in order to prevent mutual interference.

The above-described method for selecting the number of rotary angle types will be expressed in equations. The subsequent equations show an average radius of noise, a boundary for detecting a rotary angle without errors, a probability in which the noise size is more than twice the standard deviation, a switching boundary in which the probability of failing to estimate the rotary angle is given $P_{out}$, and expansion to the case of selecting one of n rotary angles.

Equation 6 is used to find the average radius of noise.

$$\sqrt{\frac{P_s}{10^{SNR/10} N_s}} \quad \text{(Equation 6)}$$

Wherein, $P_S$ is transmission power, and $N_S$ is the number of symbols in a predetermined interval.

Equation 7 is used to find the boundary for detecting the rotary angle without an error.

$$\frac{\sqrt{2-\sqrt{2}}}{2} \sqrt{P_c}\, r_{ii} \quad \text{(Equation 7)}$$

Wherein, $P_C$ is average power of the existing constellation, and $r_{ii}$ is a diagonal component value of the triangular matrix.

Equation 8 is used to find the probability in which the noise size may be greater than x times the standard deviation.

$$P(X < |x|) = 2Q(X) \therefore X = Q^{-1}\left(\frac{P(X < |x|)}{2}\right) \quad \text{(Equation 8)}$$

Equation 9 is used to find the switching boundary with the probability of $P_{out}$ when the rotary angle is not estimated.

In the case of selecting one of the original constellation and the 45 degrees rotated constellation (Equation 9)

$$Q^{-1}\left(\frac{P_{out}}{2}\right)\sqrt{\frac{P_s}{10^{SNR/10} N_s}} < \frac{\sqrt{2-\sqrt{2}}}{2}\sqrt{P_c}\, r_{ii}$$

In the case of using the existing THP:

$$Q^{-1}\left(\frac{P_{out}}{2}\right)\sqrt{\frac{P_s}{10^{SNR/10} N_s}} > \frac{\sqrt{2-\sqrt{2}}}{2}\sqrt{P_c}\, r_{ii}$$

Equation 10 is given when the case of selecting one of the original constellations expressed in Equation 9 and the constellation rotated by 45 degrees is expanded to the case of selecting one of N rotary angles.

$$\frac{\sin\left(\frac{\pi}{2k}\right)}{2\sin\left(\frac{\pi(2k-1)}{4k}\right)}\sqrt{P_c}\,r_{ii} < Q^{-1}\left(\frac{P_{out}}{2}\right)\sqrt{\frac{P_s}{10^{SNR/10}N_s}} < \quad \text{(Equation 10)}$$

$$\frac{\sin\left(\frac{\pi}{2(k+1)}\right)}{2\sin\left(\frac{\pi(2(k+1)-1)}{4(k+1)}\right)}\sqrt{P_c}\,r_{ii}$$

Wherein, k is given as $0 < k < N$

When the rotary angle is instantaneously selected, the same performance as that of the THP is acquired when the channel environment is not good, and the performance is improved by the rotary angle selection effect of the constellation when the channel environment is good.

A precoding method for improving performance by selecting the above-described rotary angle will now be described with reference to FIG. 7.

Figure 7:
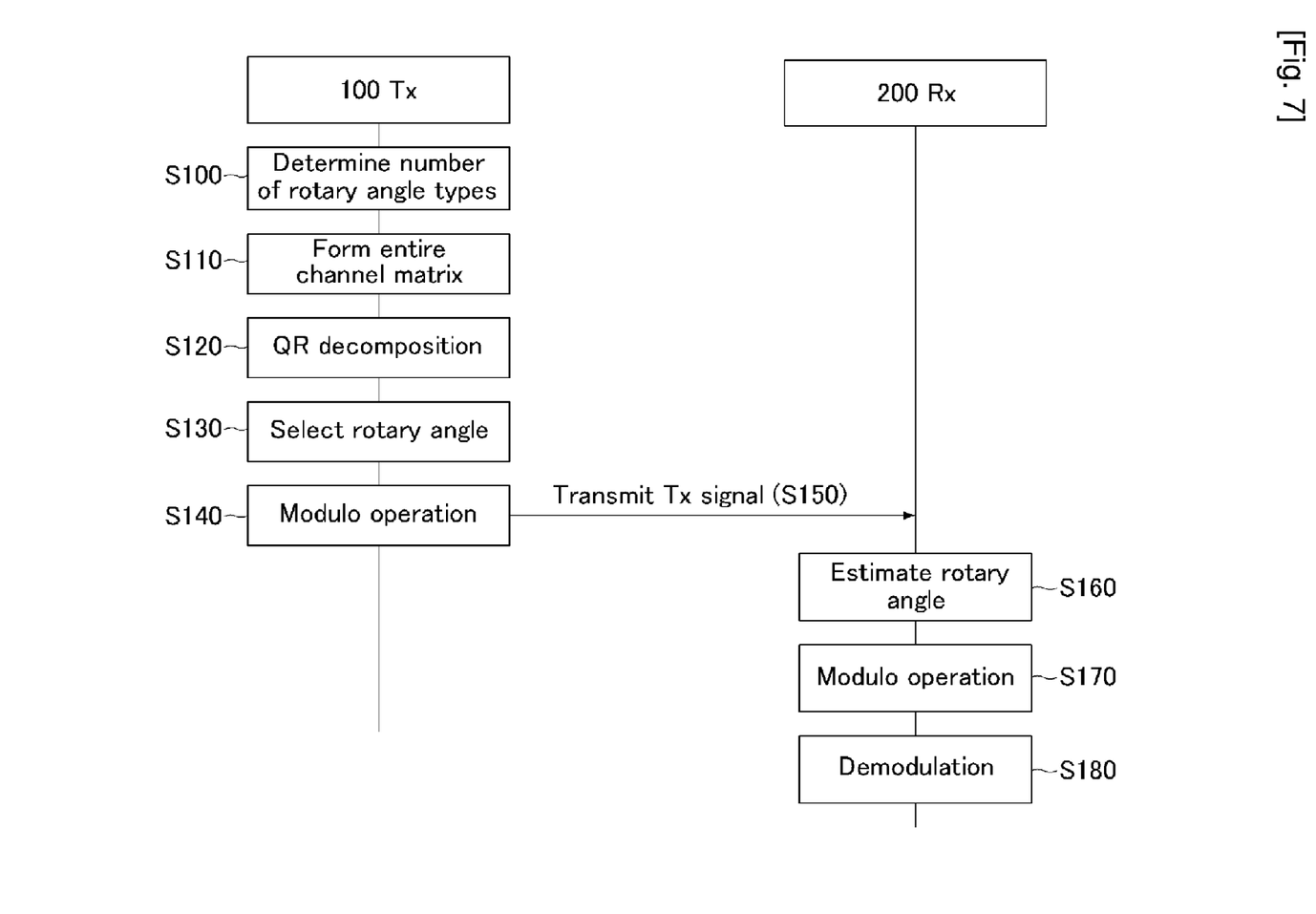
FIG. 7 is a flowchart for a precoding method according to an exemplary embodiment of the present invention.

FIG. 7 is a flowchart for a precoding method according to an exemplary embodiment of the present invention.

As shown in FIG. 7, before transmitting and receiving the signal, the transmission part 100 and the receiving part 200 of the precoder detects the channel state, and determines the number of rotary angle types for rotating the constellation of the transmission signal according to the channel condition (S100). The determined number of rotary angle types is known to the transmission part 100 and the receiving part 200 of the precoder, and the number of rotary angle types is selected so that the SNR and the distribution of the noise calculated according to the real channel condition may be provided within the boundary for estimating the rotary angle without errors.

The transmission part 100 of the precoder gathers the channels from the respective users to form an entire channel matrix (S110). In the exemplary embodiment of the present invention, the case of four users' transmitting and receiving the signal will be described. The channel formed by using the channels received from the four users is divided into a unitary matrix and a triangular matrix through QR decomposition (S120). In this instance, the method for the precoder to form the entire channel matrix and the method for dividing the channel into a unitary matrix and a triangular matrix through QR decomposition are well known to a person skilled in the art, and corresponding detailed description will be omitted in the exemplary embodiment of the present invention.

When the transmission part 100 divides the channel into a unitary matrix and a triangular matrix through QR decomposition, each triangular matrix is converted into a real channel so as to be transmitted to the receiving part 200. That is, the entire channel matrix is divided into a unitary matrix and a triangular matrix, and $Q^H$ is multiplied therewith so that the triangular matrix may be the real communication channel.

When the triangular matrix is changed to the communication channel, a transmission starts. In this instance, the signal for the first user receives no interference signal, and hence, there is no need to select the rotary angle or perform a modulo operation. Therefore, the transmission part 100 transmits the communication channel that is generated by multiplying the signal of the first user by $Q^H$ to the receiving part 200.

Then, since a signal prior to the signal of the second user acts as an interference signal of the signal of the second user, the rotary angle is selected (S130), and a modulo operation is performed (S140). That is, as expressed in Equation 4, the signal of the first user acts as interference against the signal of the second user.

Therefore, the rotary angle selector 110 selects the rotary angle of the constellation based on the real channel of the interference signal generated by the interference signal real channel generator 130, and the modulo operator 120 eliminates the interference signal through the modulo operation. When the interference signal is eliminated, the diagonal component of $1/r_{ii}$ of the triangular matrix is multiplied therewith to be a channel size to be received by the users, and when $Q^H$ is multiplied therewith by the matrix multiplier 130 to be thus changed into a communication channel, the communication channel is transmitted to the receiving part 200 through the channel (S150).

The receiving part 200 of the precoder gathers the signals from the transmission part 100 for a predetermined interval, and averages the signals. In this instance, the averaging process represents a process for the rotary angle estimator 210 to estimate the rotary angle (S160). That is, the signals that are distributed and received during a predetermined interval are stored in the receiver for a predetermined interval, and averaging on the distribution degree is performed to estimate the rotary angle selected by the rotary angle selector 110.

When the rotary angle estimator 210 estimates the rotary angle (S160), the modulo operator/demodulator 220 returns the angle by the rotated angle to maintain the original constellation, and performs a modulo operation executed by the modulo operator 120 of the transmission part 100 (S170). When the signal received through the modulo operation (S170) is not the original signal but a signal provided to another position, the signal is returned to the original position and is restored to the original bits through demodulation (S180). Through the process, the transmission part 100 of the precoder can receive signals by using less transmission power based on channel information, and the receiving part 200 can restore the original signal from the signal through the constellation rotary angle known by the transmission part 100 and the receiving part 200 and the demodulation process.

The performance comparison of the precoder according to an exemplary embodiment of the present invention and the THP will now be described with reference to FIG. 8.

Figure 8:
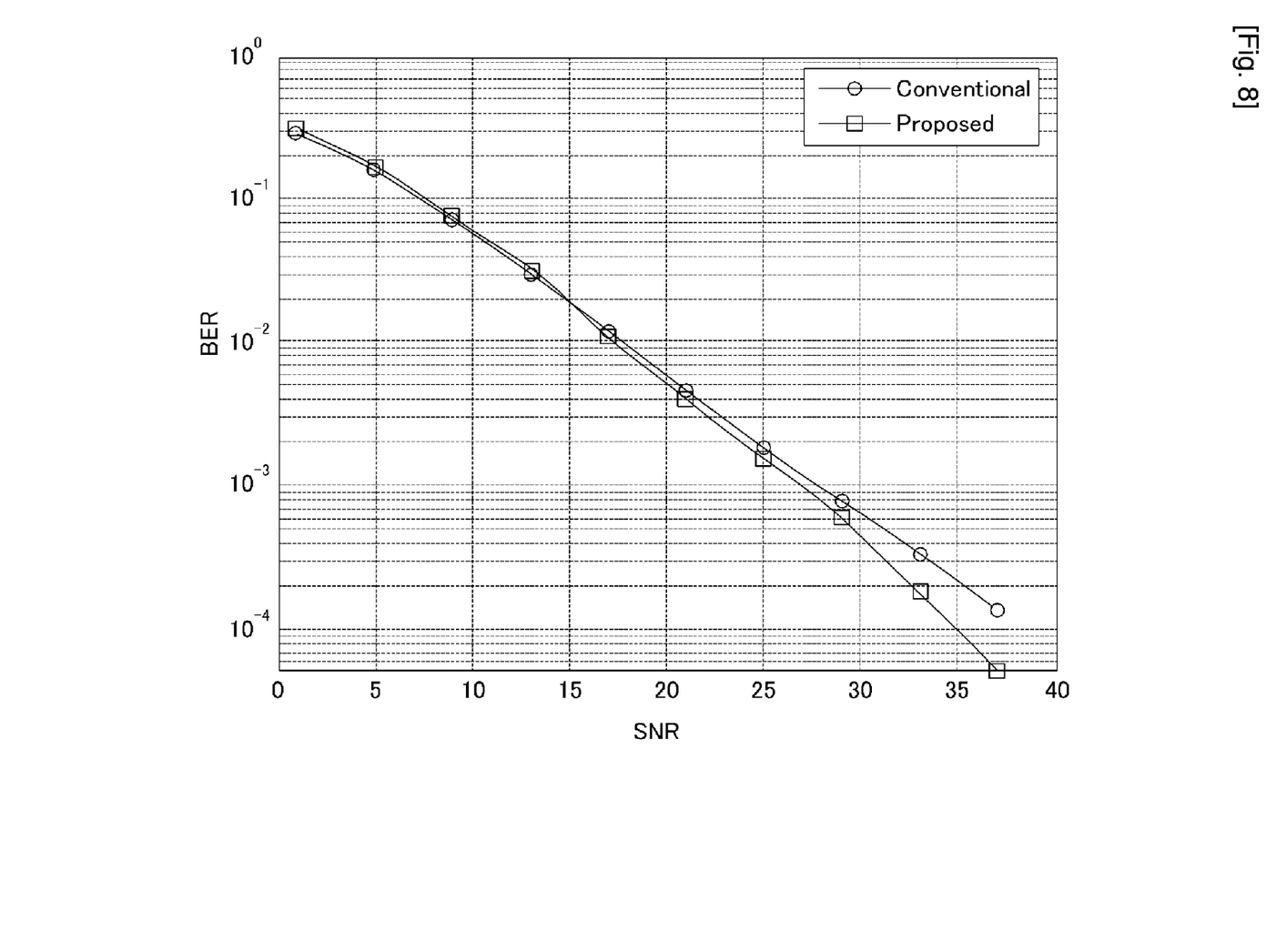
FIG. 8 is a performance comparison graph of a precoder including switching according to an exemplary embodiment of the present invention and a THP.

FIG. 8 is a performance comparison graph of a precoder including switching according to an exemplary embodiment of the present invention and a conventional THP.

There is no need to transmit additional information or additional feedback information to the receiving part 200 compared to the existing THP method in the exemplary embodiment of the present invention. Therefore, there is no need to consider the data rate of information.

FIG. 8 shows test results of selecting one of the original constellation and the 45-degree rotated constellation, to which an instantaneous selection of the proposed number of rotary angle types is added.

As illustrated by the performance comparison graph, the embodiment gives more improved performance as the signal-to-noise ratio (SNR) increases, which is the effect caused by instantaneous selection on the number of rotary angle types. That is, when the signal-to-noise ratio (SNR) increases, the effect caused by the noise is reduced to decrease the probability of inaccurately estimating the angle, and hence, it is possible to select the rotary angle among a further number of rotary angle types.

A program for realizing functions corresponding to the configuration of the exemplary embodiment of the present invention or a recording medium storing the program is included in the scope of the present invention.

According to the exemplary embodiment, transmission power is minimized when the transmission part selects the rotary angle of the constellation based on the inter-user interference signal.

Also, performance is improved without losing the structural gain of the existing multi-user multi-antenna precoder.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A precoder for precoding a transmission signal when a transmission part transmits the transmission signal to a receiving part in a wireless communication system, the precoder comprising:

an interference signal real channel generator for extracting an interference signal to be acted on a first user's transmission signal by using the first user's transmission signal and a transmitted signal of at least one second user who has transmitted a signal prior to the first user;

a rotary angle selector for selecting a rotary angle for rotating a constellation of the first user's transmission signal by using information on a number of rotary angle types extracted based on channel information for a plurality of users including the first user and the interference signal;

a modulo operator for eliminating the interference signal from the first user's transmission signal; and a matrix multiplier for using the first user's transmission signal from which the interference signal is eliminated, to transmit the first user's transmission signal to the receiving part by rotating a constellation by the selected rotary angle.

2. The precoder of claim 1, wherein the matrix multiplier multiplies the first user's transmission signal, from which the interference signal is eliminated, by a matrix extracted from a channel matrix to transmit the first user's transmission signal.

3. The precoder of claim 2, wherein the matrix corresponds to a Hermitian matrix of an unitary matrix and a triangular matrix that are generated by performing QR decomposition on the channel matrix.

4. The precoder of claim 1, wherein the interference signal that acts on the first user's transmission signal is the transmitted signal of the at least one second user.

5. The precoder of claim 1, wherein the transmission part and the receiving part use the same information on the number of rotary angle types.

6. A precoder for receiving and precoding a signal transmitted from a transmission part to a receiving part in a wireless communication system, the precoder comprising:

a rotary angle estimator for estimating constellation rotary angles of received signals from a plurality of users based on information on a number of rotary angle types extracted based on user channel information; and a modulo operator/demodulator for rotating the received signal by the estimated constellation rotary angle so that the received signal may maintain the constellation, performing a modulo operation on the received signal to determine the received signal's location, and restoring data bit of the signal received through demodulation.

7. The precoder of claim 6, wherein the rotary angle estimator gathers the signals that are received during a predetermined interval and averages the signals to estimate the rotary angle on the received signals selected from the transmission part.

8. The precoder of claim 6, wherein the transmission part and the receiving part use the same information on the number of rotary angle types.

9. A method for receiving and precoding a signal transmitted from a transmission part to a receiving part in a wireless communication system, the precoding method comprising:

gathering a plurality of received signals from a plurality of users for a predetermined interval;

averaging each received signal during the predetermined interval to estimate a constellation rotary angle of each received signal;

rotating each received signal by the corresponding constellation rotary angle to maintain the original constellation;

performing a modulo operation on the average value of each received signal to determine the position of each received signal; and demodulating each received signal whose position has been determined to restore a data bit.

10. The method of claim 9, wherein the constellation rotary angle is estimated based on a number of rotary angle types determined by using user channel information gathered from the plurality of users.

11. The method of claim 10, wherein the number of rotary angle types is determined so that the signal-to-noise ratio (SNR) and the distribution of noise calculated according to the current channel condition is provided within a boundary for estimating the constellation rotary angle without an error.

12. The method of claim 10, wherein the number of rotary angle types is given below:

$$\frac{\sin\left(\frac{\pi}{2k}\right)}{2\sin\left(\frac{\pi(2k-1)}{4k}\right)}\sqrt{P_c}\, r_{ii} < Q^{-1}\left(\frac{P_{out}}{2}\right)\sqrt{\frac{P_s}{10^{SNR/10}N_s}} <$$

$$\frac{\sin\left(\frac{\pi}{2(k+1)}\right)}{2\sin\left(\frac{\pi(2(k+1)-1)}{4(k+1)}\right)}\sqrt{P_c}\, r_{ii}$$

where PC is an average power of an existing constellation, rii is a diagonal component value of a triangular matrix, Pout is a probability when the rotary angle is not accurately estimated, and NS is the number of symbols within a predetermined interval.

* * * * *